May 29, 1923. 1,456,719
H. J. BOOSTED
TIRE PUMP
Filed Oct. 22, 1920
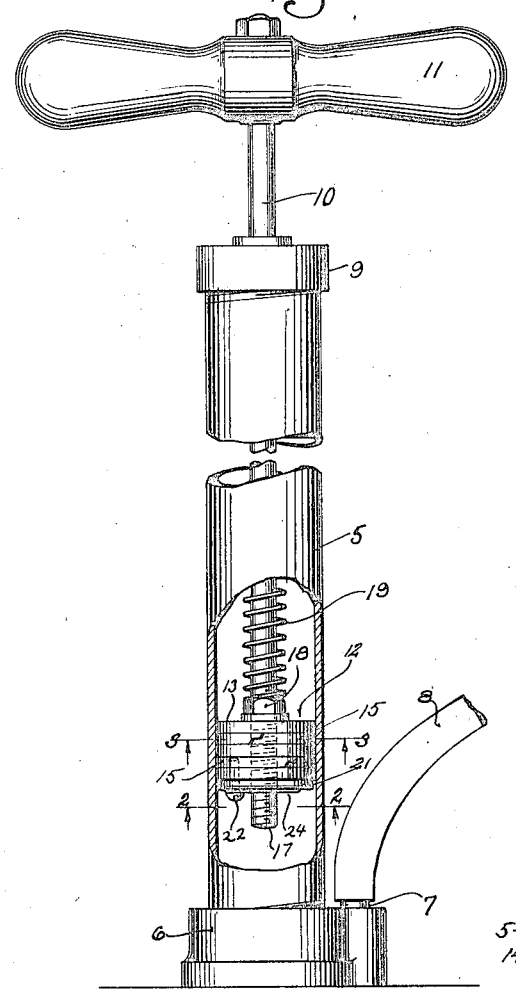
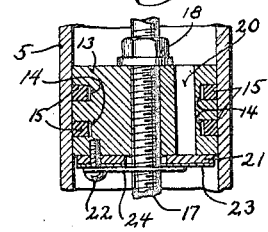
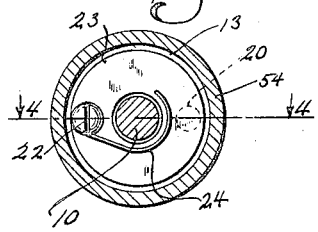
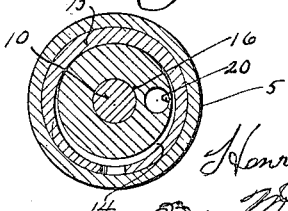

Patented May 29, 1923.

1,456,719

UNITED STATES PATENT OFFICE.

HENRY J. BOOSTED, OF KENOSHA, WISCONSIN.

TIRE PUMP.

Application filed October 22, 1920. Serial No. 418,641.

*To all whom it may concern:*

Be it known that I, HENRY J. BOOSTED, a citizen of the United States, and resident of Kenosha, in the county of Kenosha and State of Wisconsin, have invented new and useful Improvements in Tire Pumps, of which the following is a description, reference being had to the accompanying drawings, which are a part of this specification.

This invention relates to certain new and useful improvements in air compressors and refers more particularly to what is commonly termed a tire pump.

The pumps now in common use consist of a cylinder in which a plunger formed of a cup shaped leather washer works, but this structure is faulty as the air oftentimes leaks by and in a short space of time the packing member becomes absolutely useless.

Hence, with this and other inherent objections in mind, my invention has for one of its objects to provide a plunger for a tire pump so constructed that the same will be substantially leak proof whereby the pressure within the tire may be readily obtained.

Another object of this invention is to provide a plunger or piston for a tire pump which is equipped with piston rings in lieu of the leather washer formerly employed, whereby a positive seal between the plunger and the cylinder walls is obtained.

Another object of this invention is to provide a device of the class described which may be produced at substantially the same cost as the pumps now in general use.

With the above and other objects in view which will appear as the description proceeds, my invention resides in the novel construction, combination and arrangement of parts substantially as hereinafter described and more particularly defined by the appended claim, it being understood that such changes in the precise embodiment of the hereindisclosed invention may be made as come within the scope of the claim.

In the accompanying drawing, I have illustrated one complete example of the physical embodiment of my invention constructed according to the best mode I have so far devised for the practical application of the principles thereof, and in which:

Figure 1 is a view of a tire pump embodying my invention, parts thereof being broken away and in section to more clearly illustrate structural details;

Figure 2 is a view taken through Figure 1 on the line 2—2;

Figure 3 is a view taken through Figure 1 on the line 3—3; and

Figure 4 is a fragmentary sectional view taken on the plane of line 4—4 of Figure 2.

Referring now more particularly to the accompanying drawing, in which like numerals designate like parts throughout the several views:

The numeral 5 designates an elongated cylinder having its lower end closed by a base 6 provided with an outlet 7 communicating with the interior of the cylinder. The outlet 7 has a flexible tube 8 leading therefrom for connecting the same with the valve stem of the tire to be pumped, not shown, and the inlet is preferably provided with the usual one way valve to prevent the air from returning into the cylinder therethrough.

The top of the cylinder 5 is closed by a centrally bored removable cap 9, through the bore of which passes the rod 10 having a cross handle 11 secured to its outer end and a piston or plunger 12 secured to its inner end and mounted to work within the cylinder.

The piston 12 consists of a block or the like 13, of a diameter slightly less than that of the cylinder 5, having its outer face annularly channeled or recessed, as at 14. Piston rings 15, of any type, being shown in the accompanying drawing as of that type formed from one piece and having the ends thereof normally urged apart, are mounted within the channels 14 to provide a tight but slidable seal with the piston walls. The piston 12 has a central threaded bore 16 with which the lower threaded end 17 of the rod 10 is engaged, the connection between the piston and rod being locked by a nut 18.

With this construction, it will be readily seen that I provide a piston that will have a free sliding movement within the cylinder, and at the same time form a tight seal with the cylinder wall to prevent the leakage of fluid thereby. In order to relieve the operator of shocks due to striking the nut 18 against the cap 9 during the rapid reciprocation of the handle 11, an expansile spring 19 is coiled about the rod 10 intermediate the cap 9 and nut 18.

In operation, it is essential that no fluid pass the piston on its downward stroke but it is necessary to permit fluid to pass by the piston into the compression end of the cylinder upon its upward stroke. This is accomplished by providing the piston with a port or passageway 20 which is normally closed by a leather disc, or the like, 21. The disc 21 is of ring shape, surrounding the adjacent end of the rod 10, and is secured to the plunger by a fastening member 22 positioned diametrically opposite the port 20. The disc 21 has an outer disc preferably of resilient metal 23 in order to give the same body, and a spring or other resilient member 24 has one end secured to the member 22 and its other end engaging the ring 23 adjacent the port 20.

With this construction, it will be readily obvious that the port 20 is normally closed, and upon an upstroke of the piston, the fluid within the upper half of the cylinder will overcome the member 24 and open the port, permitting the fluid to enter the compression end of the cylinder. Upon the down stroke of the piston, the port 20 is closed under action of the spring 24 and also by reason of the pressure against the disc forcing the same to overlie the port. It will be readily appreciated that the disc 21 may be of rubber, leather or any desired material, and that the central openings of the discs are of greater diameter than the rod 10 to permit the movement thereof toward and away from the port 20.

What I claim as my invention is:

A tire pump comprising a cylinder; a piston provided with split metallic packing rings workable within said cylinder, and provided with a port extending longitudinally therethrough eccentric of its axis; a non-metallic disc positioned upon the bottom face of said piston, adapted to control the passage of fluid through said port; a yieldable metallic disc positioned beneath said first disc and in intimate contact with its lower surface; a curved elongated spring member engaging the lower surface of said last mentioned disc; and a screw securing one end of said spring member, and both of said discs to the lower surface of said piston at a point substantially diametrically opposite to said port.

In testimony whereof, I affix my signature.

HENRY J. BOOSTED.